Jan. 2, 1951        E. S. POMYKALA        2,536,086
EJECTION SEAT FOR HIGH VELOCITY AIRPLANES
Filed Oct. 7, 1949        2 Sheets-Sheet 1
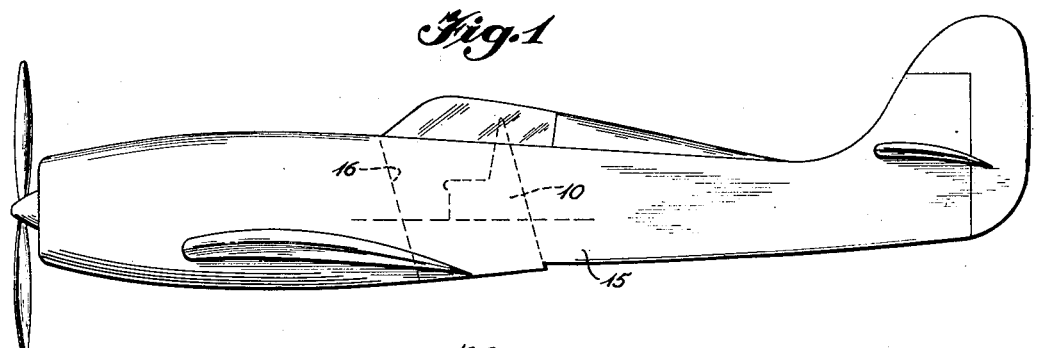
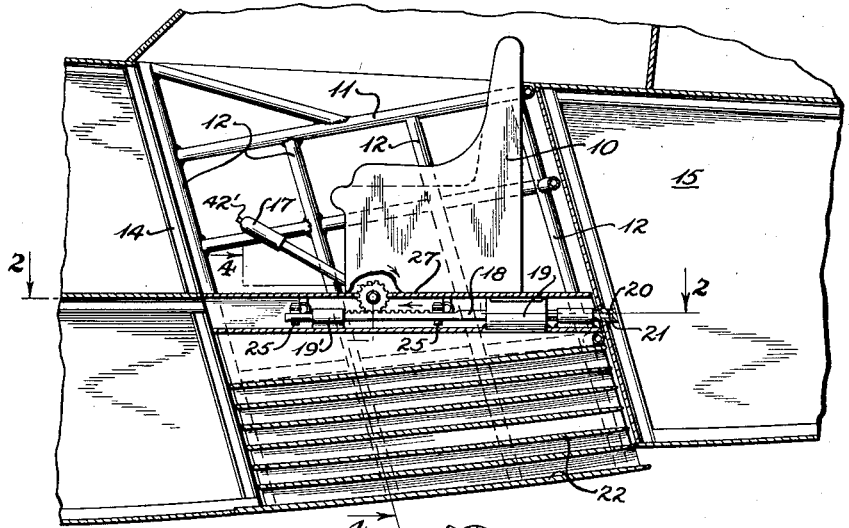
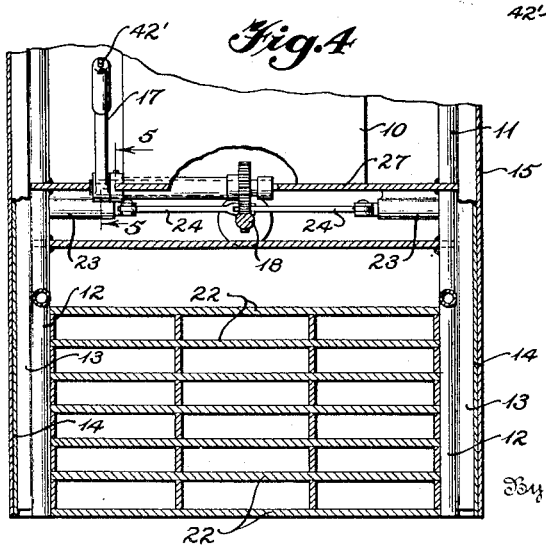
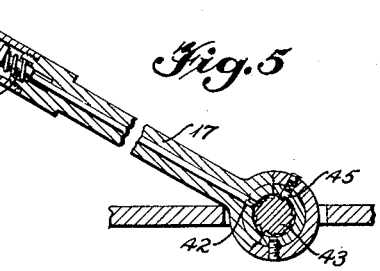
Inventor
Edmund S. Pomykala Jan. 2, 1951  E. S. POMYKALA  2,536,086
EJECTION SEAT FOR HIGH VELOCITY AIRPLANES
Filed Oct. 7, 1949  2 Sheets-Sheet 2
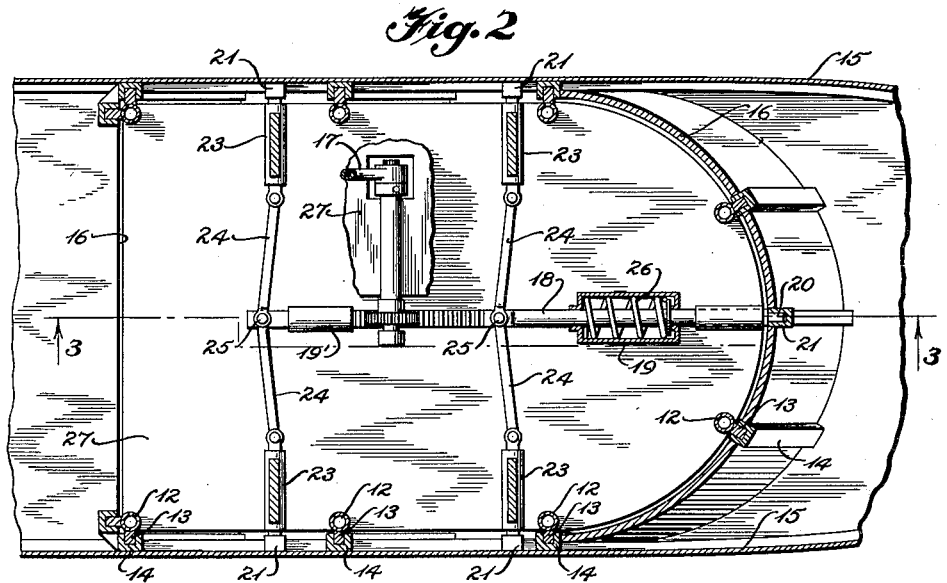
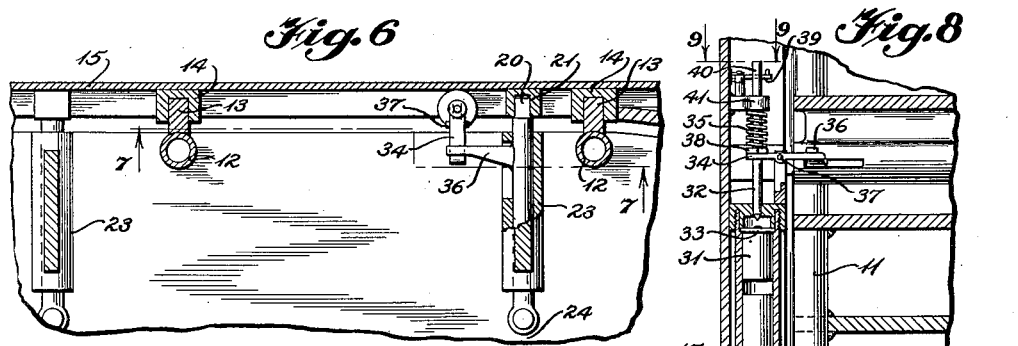
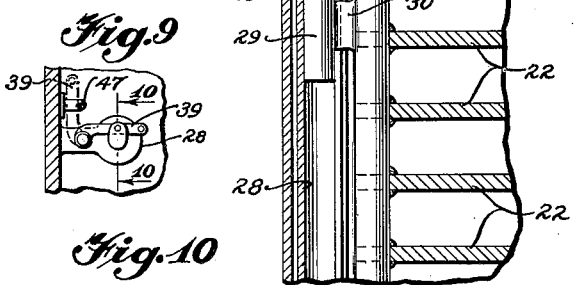
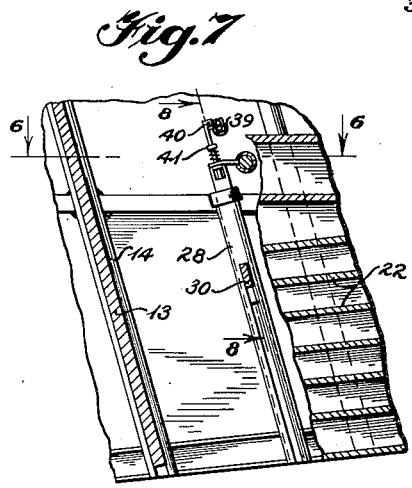
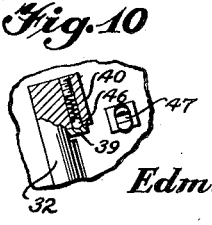
Inventor
Edmund S. Pomykala
By
Attorney Patented Jan. 2, 1951

2,536,086

UNITED STATES PATENT OFFICE 2,536,086

EJECTION SEAT FOR HIGH-VELOCITY AIRPLANES

Edmund S. Pomykala, Hyattsville, Md.

Application October 7, 1949, Serial No. 120,210

4 Claims. (Cl. 244—122)

(Granted under the act of March 3, 1883, as amended April 30, 1928; 370 O. G. 757)

The present invention relates to ejection seats for high speed aircraft, whereby the pilot in case of emergency, may be thrown free of the aircraft without injury to himself, and so that he might open his parachute without danger of fouling on the aircraft.

In high performance airplanes, that is planes which fly at speeds of the order of 500 miles an hour or more, exit to safety during flight in case of emergency, becomes a serious undertaking. This is due of course to the high air pressures which prevent the flier from leaving his seat without outside power. There are also additional difficulties connected with conventional escapes, one of which is the danger of being hit by the tail surfaces. To obviate these difficulties various new schemes have been suggested to aid the aviator in his exit to safety during flight.

It has been proposed to eject the pilot and his seat upwards by means of powder or gas pressure. It has also been suggested that the section of the airplane where the pilot is sitting, either forward or aft, be detached from the main body of the airplane. The final escape by means of parachute would take place some time later, after the falling section is free of the main part of the airplane.

The object of the present invention is to provide means whereby the pilot is forcefully ejected downwardly together with his seat merely by pulling a lever, and so unlocking various seat locking lugs, the energy for the ejection of the seat being obtained initially by gravity and then gradually increasingly augmented aerodynamically by the blast of the air stream reacting in a downward direction on a series of vanes attached to the seat as they become exposed in the ejection process.

A further object is to mount the pilot's seat on a frame work which is slidably mounted in the body of the aircraft for ejection through the bottom of the aircraft.

A further object is to provide a series of vertically spaced horizontal vanes at the lower portion of the above frame work in said aircraft, and safety means for releasing said locking means under the pilot's control.

A further object is to have the outer surface of the lowermost vane flush with the bottom surface of the aircraft in advance thereof, when the frame work is in its normal locked position, the trailing edge of said vane being slightly spaced below the bottom surface of the aircraft.

A further object is to give the above series of vanes a negative angle of attack with respect to the air blast under the aircraft as they drop into the blast, to gradually augment the downward reaction on the frame work and seat so as to progressively accelerate them in their ejection stroke.

A further object is to provide parallel vertically disposed guideways in said aircraft for the slidable frame work, the lower ends of the guideways being inclined aftwardly in a downward direction to react with the drag of said vanes in augmenting the downward ejecting force.

Other and more specific objects will appear in the following detailed description of a preferred form of the invention, having reference to the accompanying drawings, wherein:

Fig. 1 is a general view of an aircraft indicating the extent and arrangement of the slidable frame work on which the pilot's seat is incorporated, Fig. 2 is a horizontal sectional view of the slidable frame work and its adjacent parts taken on the line 2—2 of Fig. 3, Fig. 3 is an axial vertical view taken on the line 3—3 of Fig. 2, Fig. 4 is a transverse sectional view taken on the line 4—4 of Fig. 3, Figs. 5 and 6 are sectional detail views of the manual release means, and Figs. 7 to 10 are detail partial views of an explosive force augmenting means and its controls, which may be used in a modification of the above ejecting device.

The energy for the ejection of the seat in the basic form of the ejecting means depends on gravity as well as aerodynamic force exerted by the blast of air on the slightly curved and inclined vanes on the underside of the pilot's ejection seat.

The accompanying drawings outline the essential arrangement of parts in a preferred form of the invention.

In its simplest form, as shown in Figs. 2, 3 and 4, the frame work in which the pilot's seat 10 is incorporated preferably comprises an aluminum tube frame 11 having parallel tubes 12 with guides 13 slidably mounted in guide rails 14 which are fixed in the airplane structure 15, spaced around the frame work passage 16.

A releasable locking system has a control shaft, with a control lever 17 operable by the pilot, mounted transversely in the frame work and linked to the control rod 18 for moving it axially in its guide bearings 19 and 19'. Movement of the control rod forward will pull the locking pins or lugs 20 out of engagement with their respective sockets, shoulders, or stops 21 in the wall of the frame work passage 16 and will release the ejection seat from the airplane structure 15 so it may start on its ejection stroke initiated by gravity and then augmented by the aerodynamic forces applied to the vanes 22 which are fixed in the lower portion of the frame work, as they become exposed to the airstream under the speeding airplane structure 15. Obviously, any form of mechanism may be interposed between the control rod 18 and the pins or lugs 20 to pull them out or away from their repective sockets, shoulders, or stops 21. In the form shown in the drawings for purposes of illustration, the rods 20 are mounted slidably in bearings 23 and are connected by links 24 to the pivots 25 fixed on the control rod 18.

The control lever 17 may be normally made safe and ineffective by providing it with a thumb operated pawl 42 cooperating with a ratchet 43 on the shaft but normally biased out of engagement therewith by spring 44. The lugs 20 are normally made to stay in engagement with their respective sockets 21 by maintaining the locking system in its locked position by a spring-biased ball detent 45 in the shaft bearing 46 cooperating with ratchet 43, or by a spring 26, or both, as shown in Figs. 2 and 5. The spring 26 may be incorporated in the guide bearing 19 for biasing the control rod 18 in the aft direction. When it is desired to operate the locking system into released position, it is necessary to depress the push button 42' at the end of the hand grip on the lever 17 before the pawl 42 will engage the ratchet 43 on the operating shaft.

The frame work includes a corresponding portion 27 of the floor. The vanes 22 are mounted in the portion of the frame work below the level of the floor, and may have a downward curvature and negative angle of attack with respect to the airstream adjacent the bottom surface of the airplane structure, so that the reaction of the airstream on them will have a downward force component to accelerate the ejection movement. The bottom surface of the airplane may be stepped so that the trailing edge of the lowermost vane 22 will be below the surface when the frame work is locked in normal position in its passage with the leading edge of this vane substantially flush with the bottom of the airplane. The essential feature, however, is that the vanes assume a negative angle of attack with respect to the airstream as they fall into it and produce a substantially constant but limited acceleration in the downward direction. This acceleration of the frame work should approach but not exceed that which is considered within the range of human endurance, (approximately 4 or 5 g.). Although, due to the extremely short duration of the ejection stroke, even slightly higher accelerations would not be dangerous.

The vertically disposed guide means for the frame work are preferably inclined rearwardly in the downward direction so that the drag forces on the exposed portion of the frame work as it begins its ejection journey will react through the frame work against the inclined guide means to augment the downward ejection force on the frame work.

In order to initiate the ejection stroke more positively and acquire the desired acceleration more promptly, an explosion device might be added, as shown in the modification of Figs. 7 to 10, to assist the force of gravity and negative lift on the vanes.

In this modification, a pair of slotted cylinders 28 are arranged on opposite sides of the passage 16, each having a plunger 29 operating therein with a supporting member 30 operating in the slot and fixed to the frame work. These cylinders are open at the bottom and closed at the top with a powder charge 31 inserted above the plunger in normal position as shown in Fig. 8. A firing pin 32 and cap charge 33 are mounted in the top of each cylinder. The pin 32 is held in its normally retracted position, as shown, by the lever 34 against the pressure of spring 35. When the releasing lug 36 which may be a part of one of the pins 20 is moved to release the lever 34, the firing pin is released, since the arm 34 is then free to turn on its pivot 37 out of the way of the firing pin collar 38 against which the lower end of spring 35 is biased. A safety lug 39 may be used to cooperate with shoulder 40 on the shaft of the firing pin to lock it against accidental release when the device is not in use. An upper bracket 41 is provided for supporting the upper end of spring 35 for guiding the firing shaft. A ball detent 46 may be used in the shoulder 40 for retaining the pivoted safety lug 39 against accidental release, and a spring clip 47 is provided on the frame for holding the lug in inoperative position as shown in dotted lines in Fig. 9.

Obvious modifications such as replacing mechanical firing control of the cylinders by electrical means, using pneumatic or hydraulic biasing means for the control rod 18, or for operation thereof etc., may be made without departing from the spirit and scope of the present invention, as defined in the appended claims.

The invention described herein may be manufactured and used by or for the Government of the United States of America for governmental purposes without the payment of any royalties thereon or therefor.

What is claimed is:

1. A pilot's ejection seat comprising a frame work slidably mounted in a vertically disposed passage extending from the bottom of an aircraft, said frame work incorporating the pilot's seat, locking means for normally holding said frame work in place in said passage, release means operable by the pilot for releasing said locking means, and force means for supplementing gravity to provide a higher acceleration automatically upon release to eliminate any danger of fouling on the empennage of the aircraft even at extremely high speeds of aircraft travel, said supplementing force means comprising one or more horizontal airfoils incorporated in the lower portion of said frame work and exposed to the air stream upon initial dropping of said frame work from locked position due to gravity for reaction with said air stream to provide an additional downward force on said frame work.

2. A pilot's ejection seat comprising a frame work slidably mounted in a vertically disposed passage extending from the bottom of an aircraft, said frame work incorporating the pilot's seat, locking means for normally holding said frame work in place in said passage, release means operable by the pilot for releasing said locking means, and force means for supplementing gravity to provide a higher acceleration automatically upon release to eliminate any danger of fouling on the empennage of the aircraft even at extremely high speeds of aircraft travel, said frame work being provided with a series of vertically spaced horizontal airfoils in its lower portion having a negative angle of attack for progressively increasing the downward force as additional airfoils are exposed in the downward course of said frame work.

3. An ejection seat as defined in claim 2, vertically disposed guide means for said frame work inclined rearwardly in the downward direction so that the drag forces on the exposed portion of said frame work and its airfoils will react against said guide means to provide additional downward ejecting force.

4. An ejection seat as defined in claim 3, and explosive means incorporated in said guide means and controlled by said release means to augment the downward ejecting forces.

EDMUND S. POMYKALA.

REFERENCES CITED

The following references are of record in the file of this patent:

UNITED STATES PATENTS

| Number | Name | Date |
|---|---|---|
| 1,254,947 | Uttz | Jan. 29, 1918 |
| 1,317,511 | Leustig | Sept. 30, 1919 |
| 1,672,163 | Krammer | June 5, 1928 |
| 1,949,304 | Hardin | Feb. 27, 1934 |
| 2,467,763 | Martin | Apr. 19, 1949 |
| 2,476,770 | Robert | July 19, 1949 |

FOREIGN PATENTS

| Number | Country | Date |
|---|---|---|
| 609,456 | Great Britain | Sept. 30, 1948 |
| 458,480 | France | Oct. 7, 1913 |